United States Patent
Khafagy et al.

(10) Patent No.: US 10,449,945 B2
(45) Date of Patent: Oct. 22, 2019

(54) CLIMATE CONTROL FOR HYBRID ELECTRIC VEHICLE WITH ENGINE STOP-START

(71) Applicant: FORD GLOBAL TECHNOLOGIES, LLC, Dearborn, MI (US)

(72) Inventors: Hafiz Shafeek Khafagy, Dearborn, MI (US); James C Rollinson, Superior Township, MI (US); Hussam Makkiya, Troy, MI (US); Siraj Siddiqui, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 15/471,816

(22) Filed: Mar. 28, 2017

(65) Prior Publication Data
US 2018/0281777 A1    Oct. 4, 2018

(51) Int. Cl.
| | | |
|---|---|---|
| *B60L 9/00* | (2019.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *B60W 10/30* | (2006.01) | |
| *B60W 10/06* | (2006.01) | |
| *B60H 1/32* | (2006.01) | |
| *B60H 1/00* | (2006.01) | |
| *B60R 22/00* | (2006.01) | |

(Continued)

(52) U.S. Cl.
CPC ............ *B60W 10/30* (2013.01); *B60H 1/004* (2013.01); *B60H 1/00778* (2013.01); *B60H 1/00828* (2013.01); *B60H 1/322* (2013.01); *B60W 10/06* (2013.01); *B60K 6/387* (2013.01); *B60K 6/48* (2013.01); *B60K 2006/4825* (2013.01); *B60W 20/15* (2016.01); *B60W 2520/10* (2013.01); *B60W 2710/06* (2013.01); *B60W 2710/30* (2013.01); *Y10S 903/93* (2013.01)

(58) Field of Classification Search
CPC ...... B60W 20/40; B60W 10/06; B60W 10/30; B60W 30/1886; B60H 1/00457; B60H 1/3208; B60H 1/00735; B60H 1/00421
USPC ......................................... 701/22, 48; 62/89
See application file for complete search history.

(56) References Cited

U.S. PATENT DOCUMENTS

| 8,745,997 | B2 | 6/2014 | Kumar et al. | |
|---|---|---|---|---|
| 2014/0157802 | A1* | 6/2014 | Pebley | B60H 1/00457 62/89 |
| 2015/0273982 | A1* | 10/2015 | Takata | B60H 1/00778 701/48 |

* cited by examiner

*Primary Examiner* — Mahmoud S Ismail
(74) *Attorney, Agent, or Firm* — David B. Kelley; Brooks Kushman P.C.

(57) ABSTRACT

A hybrid electric vehicle (HEV) that includes an internal combustion engine and a climate control system (CCS) coupled to controllers configured to auto start-stop the engine when the HEV decelerates to an engine-stop threshold speed. The controllers are also configured to adjust a climate-fan-speed by a predetermined initial-factor, and at subsequent timed-intervals with a speed-factor that is adjusted from the initial-factor at each timed-interval, such that engine restart is inhibited by perceptually small speed adjustments and perceptually slow timed-interval cabin cooling adjustments. Such gradual adjustments are tuned to increase passenger perceptions of continuing cabin comfort, which reduce the likelihood that a passenger may adjust the CCS to require engine restart, and to increase auto stop-start fuel economy.

12 Claims, 3 Drawing Sheets

(51) Int. Cl.
*E05F 15/00* (2015.01)
*F25D 17/06* (2006.01)
*B60K 6/387* (2007.10)
*B60K 6/48* (2007.10)
*B60W 20/15* (2016.01)

CLIMATE CONTROL FOR HYBRID ELECTRIC VEHICLE WITH ENGINE STOP-START

TECHNICAL FIELD

The disclosure relates to climate control system management for hybrid electric vehicles with engine auto stop-start capability.

BACKGROUND

Hybrid electric vehicle (HEVs) typically include an internal combustion engine (ICE) coupled with an electric machine or motor/generator (M/G), and include various other components including ICE auto start-stop controllers, and a climate control system (CCS) coupled with a front-end accessory, ICE-mounted compressor, evaporators, cabin compartment fans, and related components. Typically, ICE auto-stop-start conditions are configured for micro, mild, and conventional hybrid operation and may be enabled during HEV slowing, low speeds, and during vehicle stop to improve fuel economy. Unmanaged demands from various vehicle components can inhibit and/or cause repeated cycling of the auto start-stop condition and create possibly unneeded demands for ICE start. Particularly, CCS demands for electrical power for CCS fans and additional cooling power from the ICE-mounted compressor.

Prior attempts have been made to manage the CCS during the engine auto-stop condition. One such attempt included use of complex and expensive variable displacement CCS compressors. Another attempt was directed to lowered, fixed fan speeds derived from factory-configured blower speed lookup tables.

SUMMARY

A hybrid electric vehicle (HEV) includes an internal combustion engine (ICE), and an electric machine and storage battery coupled to power electronics. At least one of an engine mounted and/or an electrically operated compressor and/or chiller are incorporated, and each are configured with cooling capacities and are coupled to a climate control system (CCS). The HEV also includes one or more controllers coupled to these and other HEV components, and which are configured to cool a cabin of the HEV to minimize discomfort of occupants in warm environments. Such controller(s) are configured to auto-stop the ICE when the HEV decelerates to an engine-stop threshold-speed, leaving various accessories and components unpowered, powered at a derated setting, or when possible, to be powered by a battery until ICE restart.

The disclosure is also directed to an HEV, once the ICE or engine is auto-stopped, having the at least one controller adapted to adjust a CCS climate-fan-speed by a predetermined initial-factor, and at subsequent timed-intervals, to change the climate-fan-speed again with a speed-factor that is adjusted from the initial-factor at each timed-interval. In this way, the CCS climate-fan-speed is changed slowly and incrementally to minimize discomfort to a cabin occupant of the HEV, such that ICE restart and an engine-restart signal is inhibited, since CCS cabin cooling adjustments are limited by the speed-factor, which lessens a likelihood of discomfort and occupant CCS adjustments that demand more cooling.

The CCS incorporates CCS-settings that include the climate-fan-speed, among other settings, and the controller(s) are adapted to receive and store the CCS-settings each time the HEV decelerates, so that the settings may be restored on ICE restart. When HEV decelerates below the engine-stop-speed, the controllers and/or the CCS will adjust the climate-fan-speed to improve perceptions of continuing comfort by cabin occupants. In one configuration, the CCS and/or other controllers will increase or step-up the climate-fan-speed when the fan-speed is slower at ICE auto-stop, and below a predetermined fan mid-speed, which may be about 50% of a maximum possible CCS cabin fan speed. When the CCS fan speed is at a slower speed at ICE auto-stop, the fan is sped up by an amount that is likely to prevent perceptions of discomfort. Here again, the engine-restart signal or ICE auto-start is inhibited because the cabin cooling adjustments are limited by the speed-factor at each timed-interval. In contrast, at ICE auto-stop, the controllers are also configured to step-down the climate-fan-speed when it is above about the predetermined fan mid-speed. Here, the climate-fan-speed is slowed incrementally when it is at a higher speed on ICE auto-stop, so that the perceptions of discomfort also may be minimized.

In various arrangements, the controller(s) are also configured to set the predetermined initial-factor to limit the step-down to greater than or equal to approximately ninety percent of any original setting above the mid-point, so that occupants perceive little change in cooling effect. In other words, the stepped-down climate-fan-speed does not exceed approximately ten percent of an original-speed at ICE auto-stop, which thereby inhibits ICE or engine-restart. Also, the timed-interval is predetermined to be between about 15 and about 30 seconds, or more or less, to make each adjustment at long enough intervals to further minimize any perceived discomfort during the ICE auto-stop condition. Upon detecting the engine-restart signal or ICE auto-start, the controllers are also modified to reset the CCS with the stored CCS-settings such that the climate-fan-speed is restored to its original setting at auto-stop.

The disclosure also contemplates variations to these configurations wherein the at least one controller is arranged to recursively-adjust the speed-factor at each timed-interval by at least one of a constant-function and a non-linear nth-root-function, such as a square-root or third-root function, which limits each climate-fan-speed adjustment by the speed-factor. In other modifications, the at least one controller is also configured to limit the speed-factor adjustment according to one or more of an exterior and/or ambient temperature and a sunload, if any, such that the adjustment in the speed-factor is increased when the ambient temperature exceeds a predetermined comfort-temperature. The HEV also contemplates the CCS to incorporate a cabin evaporator that has an evaporator temperature sensor. In this arrangement, the at least one controller is configured to correspondingly adjust the speed-factor in response to a temperature change in the evaporator temperature sensor.

The disclosure is also directed to methods of controlling the HEV and the CCS, and includes the at least one controller stopping the ICE when the HEV decelerates below the engine-stop-speed. The controllers are also adapted for adjusting the climate-fan-speed, by the predetermined initial-factor and at subsequent timed-intervals with the speed-factor, which is adjusted from the initial-factor at each timed-interval, such that an engine-restart signal is inhibited by cabin cooling adjustments limited by the speed-factor. The controllers of the method are also configured for receiving and storing the CCS-settings, when and each time the vehicle decelerates. The methods further include stepping-up the climate-fan-speed, by the controllers, when it is adjusted below the predetermined fan mid-speed, and stepping-down the climate-fan-speed when it is adjusted above the predetermined fan mid-speed, such that the engine-restart signal is thereby inhibited by cabin cooling adjustments again limited by the speed-factor at each timed-interval.

As with the other arrangements of the disclosure, the methods also include resetting, by the at least one controller, the CCS with the stored CC S-settings in response to the engine-restart signal such that the climate-fan-speed is restored. The methods further include recursively adjusting, by the at least one controller, the speed-factor at each timed-interval by at least one of a constant-function and a non-linear nth-root-function that limits each climate-fan-speed adjustment by the speed-factor.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to produce embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
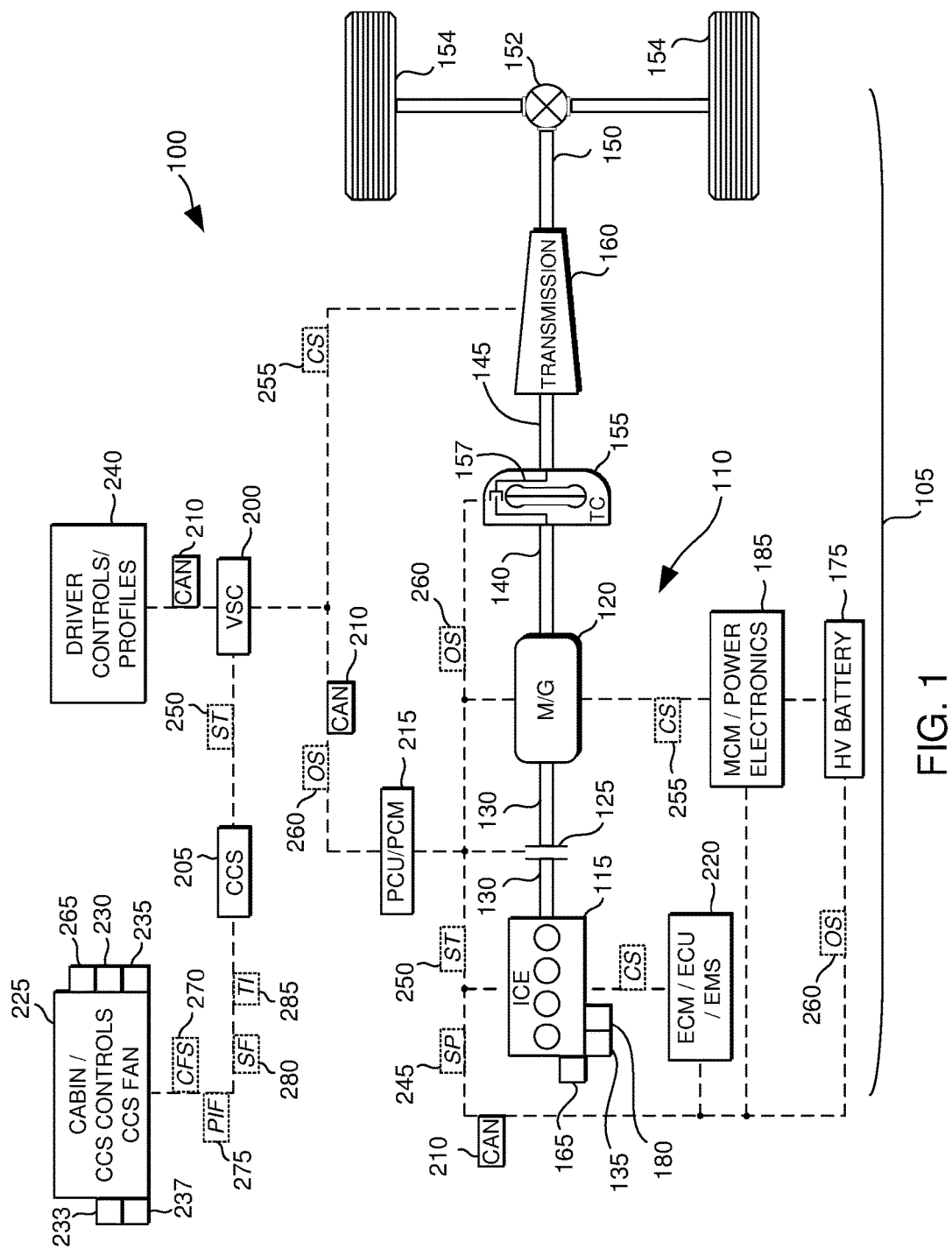
FIG. 1 is an illustration of a hybrid electric vehicle and its systems, components, sensors, actuators, and methods of operation.

With reference now to the various figures and illustrations and to FIGS. 1, 2, 3, 4, and 5, and also specifically to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes an internal combustion engine (ICE) 115 and an electric machine or electric motor/generator/starter (M/G) 120, which generate power and torque to propel vehicle 100. Engine or ICE 115 is a gasoline, diesel, biofuel, natural gas, or alternative fuel powered engine, or a fuel cell, which generates an output torque in addition to other forms of electrical, cooling, heating, vacuum, pressure, and hydraulic power by way of front end engine accessories described elsewhere herein. ICE 115 is coupled to electric machine or M/G 120 with a disconnect clutch 125. ICE 115 generates such power and associated engine output torque for transmission to M/G 120 when disconnect clutch 125 is at least partially engaged.

M/G 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to M/G 120 to enable operation as an electric generator, and to other components of vehicle 100. Similarly, M/G 120 may also operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, M/G or electric machine 120 may assist engine 115 in a "hybrid electric mode" or an "electric assist mode" by transmitting additional power and torque to turn drive shafts 130 and 140. Also, M/G 120 may operate in an electric only mode wherein engine 115 is decoupled by disconnect clutch 125 and shut down, enabling M/G 120 to transmit positive or negative torque to M/G drive shaft 140. When in generator mode, M/G 120 may also be commanded to produce negative torque and to thereby generate electricity for charging batteries and powering vehicle electrical systems, while engine 115 is generating propulsion power for vehicle 100. M/G 120 also may enable regenerative braking by converting rotational, kinetic energy from powertrain 110 and/or wheels 154 during deceleration, into regenerated electrical energy for storage, in one or more batteries 175, 180, as described in more detail below.

Disconnect clutch 125 may be disengaged to enable engine 115 to stop or to run independently for powering engine accessories, while M/G 120 generates drive power and torque to propel vehicle 100 via M/G drive shaft 140, torque convertor drive shaft 145, and transmission output drive shaft 150. In other arrangements, both engine 115 and M/G 120 may operate with disconnect clutch 125 fully or partially engaged to cooperatively propel vehicle 100 through drive shafts 130, 140, 150, differential 152, and wheels 154. Driveline 105 and powertrain 110 also include a torque convertor (TC) 155, which couples engine 115 and M/G 120 of powertrain 110 with and/or to a transmission 160. TC 155 may further incorporate a bypass clutch and clutch lock 157 that may also operate as a launch clutch, to enable further control and conditioning of the power and torque transmitted from powertrain 110 to other components of vehicle 100.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for M/G 120 and during regenerative braking, and for other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, M/G 120, and vehicle 100, as depicted in FIG. 1, through various mechanical and electrical interfaces and vehicle controllers, as described elsewhere herein. High voltage M/G battery 175 is also coupled to M/G 120 by one or more of a motor control module (MCM), a battery control module (BCM), and/or power electronics 185, which are configured to condition direct current (DC) power provided by high voltage (HV) battery 175 for M/G 120. MCM/BCM/power electronics 185 are also configured to condition, invert, and transform DC battery power into three phase alternating current (AC) as is typically required to power electric machine or M/G 120. MCM/BCM 185/power electronics is also configured to charge one or more batteries 175, 180 with energy generated by M/G 120 and/or front end accessory drive components, and to supply power to other vehicle components as needed.

With continued reference to FIG. 1, vehicle 100 further includes one or more controllers and computing modules and systems, in addition to MCM/MCM/power electronics 185, which enable a variety of vehicle capabilities. For example, vehicle 100 may incorporate a vehicle system controller (VSC) 200, a climate control system (CCS) 205, and others, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, VSC 200 and CCS 205 may control, be controlled by, communicate signals to and from, and exchange data with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, MCM/BCM 185, VSC 200, CCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, HEV or vehicle 100 also may include a powertrain control unit/module (PCU/PCM) 215 coupled to VSC 200 or another controller, and coupled to CAN 210 and engine 115, M/G 120, and TC 155 to control each powertrain component. An engine control module (ECM) or unit (ECU) or energy management system (EMS) 220 may also be included having respectively integrated controllers and be in communication with CAN 210, and is coupled to engine 115 and VSC 200 in cooperation with PCU 215 and other controllers.

In this arrangement, VSC 200 cooperatively manages and controls the vehicle components and other controllers, sensors, and actuators. For example, the controllers may communicate control commands, logic, and instructions and code, data, information, and signals to and/or from engine 115, disconnect clutch 125, M/G 120, TC 155, transmission 160, batteries 175, 180, and MCM/BCM/power electronics 185, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, and other controllers.

For further example, various other vehicle functions, actuators, and components may be controlled by the controllers within the vehicle systems and components, and may receive control signals (CS) and other signal (OS) from other controllers, sensors, and actuators, which may include, for purposes of illustration but not limitation, fuel injection timing and rate and duration, throttle valve position, spark plug ignition timing (for spark-ignition engines), intake/exhaust valve timing and duration, front-end accessory drive (FEAD) components such as air conditioning (A/C) refrigerant compressor 165, transmission oil pumps, a FEAD alternator or generator, M/G 120, high and low voltage batteries 175, 180, and various sensors for battery charging or discharging (including sensors for determining the maximum charge, state of charge—SoC, and discharge power limits), temperatures, voltages, currents, and battery discharge power limits, clutch pressures for disconnect clutch 125, bypass/launch clutch 157, TC 155, transmission 160, and other components. Sensors communicating with the controllers and CAN 210 may, for further example, establish or indicate engine rotational speed or revolutions per minute, wheel speeds, vehicle speed sensing, engine coolant temperature, accelerator pedal position sensing, brake pedal position sensing, ambient air temperature, component and passenger and CCS 205 cabin/compartment temperatures and fan speeds, barometric pressure, engine and thermal management system and compressor and chiller pressures and temperatures, among others.

Figure 2:
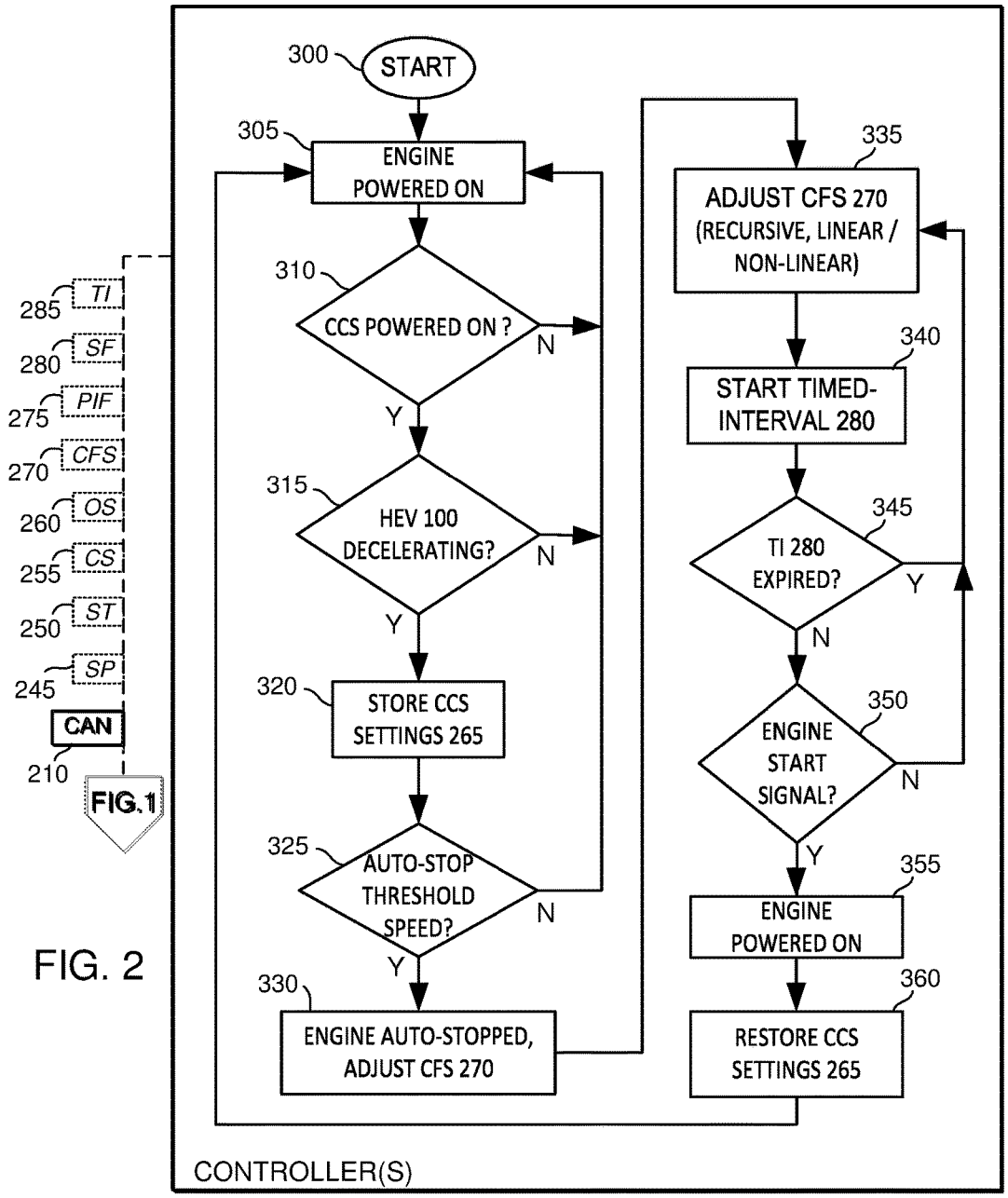
FIG. 2 illustrates certain aspects of the disclosure depicted in FIG. 1 in operation, and with various components removed and rearranged for purposes of illustration.

With continuing reference to the various figures, especially now FIGS. 1 and 2, the disclosure contemplates HEV 100 to include the CCS 205 coupled with at least one of an ICE mounted and/or an electrically operated compressor and/or chiller, which are each configured with cooling capacities. HEV 100 and CCS 205 also include one or more controllers coupled to these and other HEV components, and configured to cool a cabin 225 having various occupant-accessible CCS controls 230 and at least one fan or blower 235 (FIG. 1). HEV 100 may also incorporate factory-set, user-adjustable and stored driver profiles and settings 240 and interactive displays that interact with other controllers and subsystems, and which may include driver controls, preferred climate control settings, seat positions, HEV performance and mode profiles and settings, and the like. Additionally, controller(s), such as VSC 200, ECM/ECU 220, and others, are configured to monitor HEV 100 speed, and to generate an auto-stop signal (SP) 245 that powers down ICE 115, when HEV 100 decelerates to an engine-stop threshold-speed. SP 245 also enables VSC 200 and/or other controllers to derate and/or power down various accessories and components of HEV 100.

Typically, HEV 100, when configured for auto-stop-start operation, the controller(s) will auto-stop ICE 115 and other components and accessories each time HEV 100 decelerates to the engine-stop threshold-speed, and/or comes to a full stop, which enables HEV 100 to reduce fuel consumption by eliminating unneeded idling of ICE 115. Deceleration of HEV 100 may be detected when a vehicle brake pedal is depressed, an acceleration pedal is released, and when HEV 100 otherwise decelerates due to road grade and for other reasons. ICE 115 will remain powered down until the controllers generate and communicate an auto-start signal (ST) 250. The ST signal 250 can be generated and communicated for any number reasons, which may require restart and operation of ICE 115. ST 250 may be generated in response to various control signals (CS) 255 and other signals (OS) 260 that are described elsewhere herein, and may include CS 255 and OS 260 being generated with the accelerator pedal being depressed, a SoC of battery 175 requires recharge by M/G 120, and component and accessory electrical loads increased and required more power than may be available from battery 175, an occupant adjusts and demands more cooling from CCS 205 due to perceptions of warming, humidity, and discomfort in the cabin 225, and for other reasons.

For example, upon auto-stop 245 of ICE 115, certain accessories and components are derated from a full-power setting to a lower power setting, and/or powered off, to conserve battery power. This may often include those accessories and components that rely upon power supplied by ICE 115. In the alternative, in response to SP 245, VSC 200, CCS 205, and other controllers, may abruptly set other components and accessories to a low power configuration, including for example, CCS controls 230 and CCS fan 235. Since CCS 205 usually loses ICE-powered-compressor 165 refrigerant cooling capability, CCS fans or blowers 235 are powered off or immediately adjusted to a low power setting, which in past configuration was intended to slow the warming of evaporators located in the cabin.

This prior arrangement was intended to create a perception of continued cooling on auto-stop, but has instead caused occupants to manually adjust CCS 205, because the abrupt change or a powered down fan or drastically reduced fan-speed, caused instant perceptions of warming and discomfort by occupants of HEV cabin 225. In humid and/or environments, occupants may respond to the perception of warming, and immediately adjust CCS 205 to demand higher cooling power. This causes CCS 205 or other controllers to generate and communication ST 250, to restart ICE 115. Consequently, the potential is lost for reduced fuel consumption of the auto-stopped ICE 115, during slow HEV speeds and full stops. The disclosure includes improvements to reduce and/or delay occupant perceptions of discomfort, which inhibits and delays possible generation of ST 250 and auto-restart of ICE 115, in such circumstances.

Figure 3:
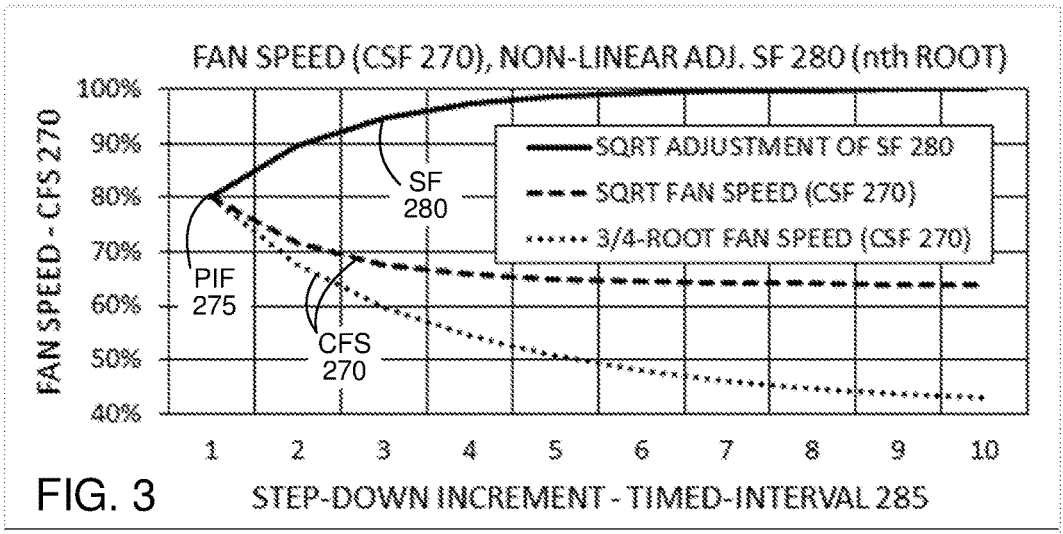
FIGS. 3, 4, and 5 illustrate additional aspects and capabilities of the vehicle and systems and methods of FIGS. 1 and 2, configured for operation with certain operational capabilities of the disclosure.

With continued reference to the figures, and now especially FIGS. 1, 2, and 3, the disclosure includes HEV 100 and the controllers, such as VSC 200 and CCS 205, configured to respond to SP 245 and auto-stop or power down ICE or engine 115. When deceleration of HEV 100 is detected, VSC 200 and/or CCS 205 or other controllers receive and store CCS settings 265, which can be stored and retrieved from the various controllers, as well as from driver profiles 240, and which may include driver and occupant preferred temperatures, climate-fan-speeds (CFS) 270, cabin front/back and driver/passenger comfort settings, and other settings and parameters. Storing CCS settings 265 when deceleration is detected and during auto-stop of ICE 115, enables CCS settings 265 to be restored upon ICE auto-restart. Upon detecting the engine-restart signal ST 250 or ICE auto-start, the controllers are also modified to reset the CCS 205 with the stored CCS-settings 265, whereby CFS 270 is restored to its original setting before being adjusted after auto-stop. Once ICE 115 is auto-stopped, the at least one controller is further modified to adjust CFS 270, without implementing an abrupt change, and without powering down the CCS fan 235, such that occupant perceptions of discomfort are minimized.

More specifically, the at least one controller is configured to adjust the original CFS 270 by a predetermined initial-factor (PIF) 275, and subsequently to manage CFS 270 with a speed-factor (SF) 280 that is initially equal to the PIF 275 and later adjusted by SF 280 at subsequent timed-intervals (TI) 285. SF 280 is initially adjusted from PIF 275, and is thereafter adjusted incrementally, and linearly and/or non-linearly. PIF 275 and SF 280 are multipliers that are adjusted incrementally, and the original CFS 270 is multiplied first by PIF 275 and subsequently by SF 280 to thereby adjust CFS 270 at each TI 285. Driver profile and settings 240 may include a factory determined and/or driver/occupant adjustable PIF 275, as well as the other CCS 205 related settings and parameters contemplated by the disclosure.

Occupant perceptions of discomfort have been found to be minimized when PIF 275 is between about 75% and about 95%, and/or between about 80% and about 90% which is multiplied by the original CFS 270. This generates a new, adjusted CFS 270, which is stepped-down or reduced, or in certain circumstances stepped-up or increased. Similar occupant experiences result when TI 285 is between about 15 second and 30 seconds, and/or about 20 seconds. As with other settings, TI 285 may also be established as a factory-setting and/or may be driver/occupant adjustable, and stored and retrievable by any of the controllers, including driver profiles and settings 240.

In continuing examples, and for auto-stop circumstances when CFS 270 is originally between a fan mid-speed of about 50% and about 100% of a full-power setting, small step-downs and/or reductions by PIF 275 and SF 280 over TIs 285, until ST 250 is received, maximize occupant perceptions of continued cooling comfort. Also, for auto-stop circumstances when CFS 270 is originally between about a low-power setting such about 5%-10% and the fan mid-speed of about 50% of full-power, occupants perceive less discomfort with small step-ups and/or increases by PIF 275 and SF 280 over TIs 285. Limiting adjustments to CFS 270 to small increments by PIF 275 and SF 280 over TIs 285, inhibits generation of ST 250 and auto-start of ICE 115, since occupant perceptions of discomfort are reduced.

For example, for a PIF 275 of about 90%, the CFS 270 can be multiplied by PIF 275 and is stepped-down and adjusted to be 90% of its original value when ICE 115 is auto-stopped, which is a 10% reduction that minimizes perceptions of reduced cooling. In a contrasting example, if CFS 270 is to be stepped-up, then CFS 270 can be multiplied by 2—PIF 275 of 90%=110% times PIF 275, which results in CFS 270 being stepped up 10%, which for an original CFS 270 that is below about 50% of full power, also results in minimized perceptions of reduced cooling. When the stepped-up or stepped-down initial adjustment by PIF 275 is subsequently further adjusted by SF 280, SF 280 is first adjusted from PIF 275 either linearly or non-linearly, and then multiplied by CFS 270 to generate a new CFS 270 that is adjusted by another value for SF 280 as described later.

In this way, the CCS climate-fan-speed CFS 270 is changed slowly and incrementally to minimize discomfort to the occupants of cabin 225, and maximize perceptions of continuing cooling and comfort, which reduces the likelihood that occupants may manually adjust CCS controls 230 to increase demand for more cooling during ICE auto-stop conditions. In turn, this enables realization of the potential fuel savings benefits. Consequently, these configurations utilize SF 280 to limit adjustments to CCS 205 for cooling of cabin 225. These gradual and timed-interval adjustments to CCS 205 are thereby tuned to increase occupant perceptions of continued cabin comfort, despite the ICE auto-stop condition.

In additional exemplary modifications, the at least one controller, such VSC 200, CCS 205, and others, are configured to initialize PIF 275 and SF 280, which may be retrieved from driver profiles/settings 240, and to recursively-adjust SF 280 at each TI 285, by at least one of a constant-function or linear function and a non-linear nth-root-function. The constant or linear function may be a preferred percentage such as 5%, 10%, 15% and the like. SF 280 is initially adjusted to be PIF 275 multiplied the preferred linear function. At the next TI 285, SF 280 is again adjusted by the constant function. An nth-root function may include a square-root, a third-root, a fourth-root and similar functions. For example, when SF 280 is adjusted to initially be adjusted from PIF 275, SF 280 may be initially set to be the square root of PIF 275. Thereafter, at each TI 285, such as about every 20 seconds, a new SF 280 is calculated to be the square-root on the prior SF 280. At each TI 285, CFS 270 is multiplied by the newly adjusted SF 280 to establish a newly incremented CFS 270. In this way, CFS 270 can be adjusted non-linearly to enable non-abrupt, incremental adjustments that minimize occupant perceptions of discomfort during auto-stop of ICE 115, which inhibits generation of ST 250 since occupants are less likely to demand more cooling from CCS 205, and will thereby avoid unnecessarily triggering auto-start of ICE 115.

The disclosure is also directed to improvements wherein the at least one controller is further configured to modify PIF 275 and to limit adjustments to SF 280 according to one or more of an exterior and/or ambient temperature and a sunload in the environment surrounding HEV 100. For example, in a warm and/or humid environment, PIF 275 and SF 280 may be automatically retrieved from a CCS settings/ambient temperature calibration table that may be stored in driver profile/settings 240, and/or interactively selected from and/or adjusted using one or more interactive settings stored and retrievable therefrom. This information enables automated adjustment of PIF 275 and SF 280 whereby SF 280 is increased when the ambient temperature exceeds a predetermined comfort-temperature from the calibration table. For example, if the ambient temperature is about 90 degrees Fahrenheit or about 32 degrees Celsius, PIF 275 may be set to 95%, and SF 280 may be adjusted linearly at perhaps 5%, so that adjustment to CFS 270 is lessened, which may improve occupant perceptions of continued cooling during auto-stop of ICE 115. Similarly, HEV 100 also contemplates CCS 205 to incorporate an evaporator 233 that may include an evaporator temperature sensor 237, which may also be utilized to further adjust the speed-factor in response to temperature changes in the evaporator, to further manage and improve occupant perceptions of comfort during auto-stop. For example, CCS 205 may make smaller reductions in CFS 270 by adjusting PIF 275 and SF 280, to slow warming of evaporator 233, and further as evaporator does warm, ramping up or stepping-up CFS 270 as evaporator temperature increases to further possibly delay occupant perceptions of warming, and thus extending the inhibition of ST 250.

The various configurations of the disclosure are also directed to methods of controlling HEV 100 and CCS 205, which are described throughout the preceding descriptions, and now in view of FIG. 2. The methods include the at least one controller, such as one or more VSC 200, CCS 205, and others, initiating control logic at step 300, and monitoring ICE 115 of HEV 100, to detect ICE 115 powered on at step 305, and CCS 205 also being powered on at step 310. If CCS 205 is not powered, control returns to monitoring step 305 or the logic may terminate. If CCS 205 is powered on at step 310, then the method moves control to step 315 to detect whether HEV 100 decelerates, and if not returns control to step 305.

If HEV 100 deceleration is detected, the method stores initial CCS settings 265 at step 320, and monitors deceleration of HEV 100 at method step 325, to detect whether HEV 100 slows to the auto-stop-threshold speed, which triggers generation of SP 245, and powers down ICE 115. If SP 245 is not generated, the method continues monitoring at step 305. If ICE 115 is powered down at step 330, the method then initiates adjustment of CFS 270 at steps 335, 340, and 345, as described previously, while monitoring for ST 250 for ICE restart at step 350. Once ICE 115 is restarted, the method move to step 355, and then to step 360 where CCS settings are restored to CCS 205, and the methods continues monitoring at step 305, or terminates.

Figure 4:
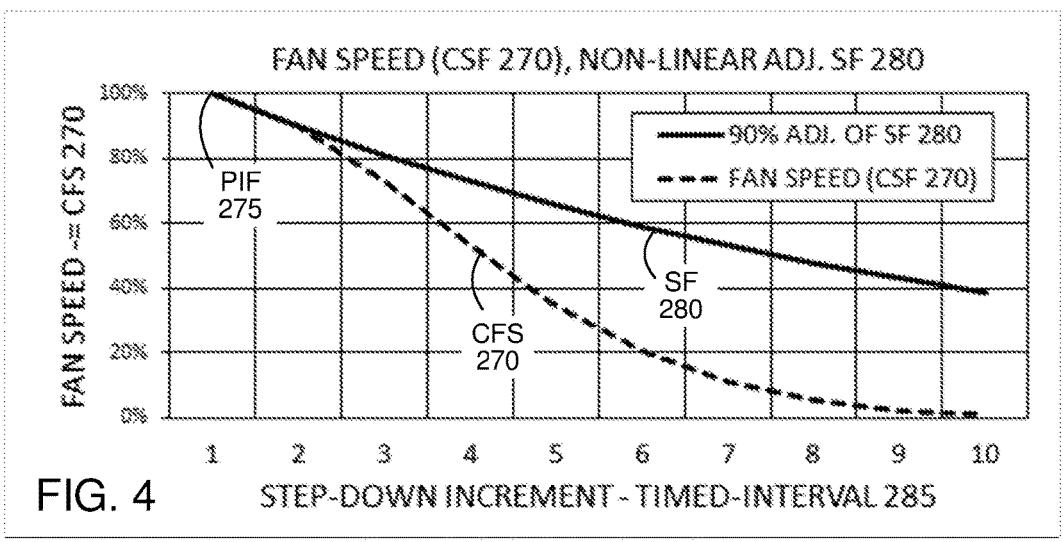
Figure 5:
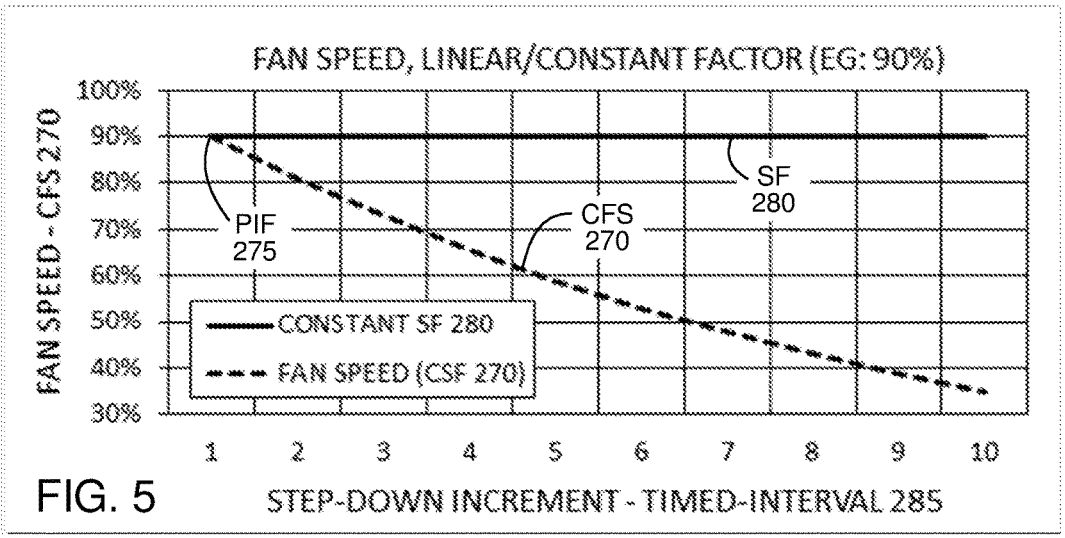

With continuing reference to FIGS. 1 and 2, and now also to FIGS. 3, 4, and 5, additional examples are described of CCS 205 in operation, wherein references to "Step-Down Increment" are intended to also illustrate similar results for the aforementioned stepping-up capabilities of CCS 205. In FIG. 3, two illustrative examples are depicted of CFS magnitude signals 270 are plotted with PIF 275 and SF 280 being recursively and non-linearly adjusted at each timed-interval TI 285. In the first example, a non-linear, square-root function is used to adjust SF 280, and an initial or original fan-speed CFS 270 was set at about 80% before SP 245 is generated and ICE 115 is powered down. PIF 275 was set either at the factory and/or was adjusted via CCS 205 and driver profiles/settings 240 to also be about 80% at the first TI 285.

At TI 285 #2, about 20 seconds later, the original CFS 270 was recursively adjusted by the 80% multiplier PIF 275, such that CFS 270 is reduced from 80% to about 72%, and the new SF 280 is adjusted by taking the square-root of the 80% value of PIF 275. This results in the new SF 280 of about 89%. It should be understood that this gradual adjustment of CFS 270 from its original settings at auto-stop of about 80% to about 72%, which is about a 10% reduction, will ensure that occupants of HEV 100 will perceive continued cooling despite the auto-stop. Consequently, the occupants should be unlikely to initiate a manual adjustment of CCS 205 to demand more cooling, which inhibits ST 250 and restart of ICE 115, thus enabling the intended fuel savings. At TI 285 #3, the new SF 280 is about 95%, an even smaller increment, and the new CFS 270 is reduced to about 67% from the last setting of about 72%, and so on, until ST 250 is detected, or until about TI 285 when SF 280 is adjusted to about 100% and no further reductions in CFS 270 are made by CCS 205.

In the second example of FIG. 3, a non-linear, $3/4^{th}$-root function is utilized, which causes CFS 270 to be reduced in relatively larger increments. In this example, CFS 270 is originally at about 100% or full-power when SP 245 triggers ICE 115 to power down. At TI 285 #2, CFS 270 is reduced from 80% to about 67%, and then at TI 285 #3 to about 60%, which may be more desirable for improved battery power conversation, but which may be less desirable in warmer environments. FIG. 4 shows another example where SF 280 is adjusted by a constant function such that CFS 270 is non-linearly adjusted. Here, SF 280 is adjusted by 90% at each TI 285, such that CFS 270 is reduced from 100% at TI 285 #1 to about 90% at TI 285 #2, while SF 280 is adjusted from the PIF 275 value of 100% to about 90%. At TI 285 #3, CFS 270 is reduced from 90% to about 73%, while SF 280 is adjusted to 81%, and so on until CFS 270 is reduced to about 11% at TI 285 #7, and SF 280 is adjusted down to about 53%. This configuration can reduce CFS 270 more quickly if desired, than the prior nth-root function examples. With reference continuing to the preceding figures and now specifically also to FIG. 5, another example is illustrated wherein PIF 275 is initialized to 90% and SF 280 is set to be a constant function or linear and unchanging at about 90%. Here, CFS 270 is adjusted substantially linearly at each TI 285.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   at least one controller configured to automatically stop an engine when a vehicle decelerates below an engine-stop-speed;
   a climate control system (CCS) coupled to the at least one controller and configured with CCS-settings that include climate-fan-speed; and
   the at least one controller configured to
   adjust the climate-fan-speed by a predetermined initial-factor and at subsequent timed-intervals with a speed-factor that is adjusted from the initial-factor at each timed-interval, such that an engine-restart signal is inhibited by cabin cooling adjustments limited by the speed-factor,
   receive and store the CCS-settings when the vehicle decelerates,
   step-down the climate-fan-speed when operative above a predetermined mid-speed such that the engine-restart signal is inhibited by cabin cooling reductions limited by the speed-factor at each timed-interval, and
   set the predetermined initial-factor to limit the step-down to greater than or equal to approximately N percent, such that the stepped-down climate-fan-speed does not exceed approximately 100 minus N percent of an original-speed to inhibit the engine-restart signal.

2. The vehicle according to claim 1, further comprising:
   the at least one controller configured to
   step-up the climate-fan-speed when adjusted below a predetermined mid-speed such that the engine-restart signal is inhibited by cabin cooling adjustments limited by the speed-factor at each timed-interval.

3. The vehicle according to claim 1, further comprising:
   the controller further configured to reset the CCS with the stored CCS-settings in response to the engine-restart signal such that the climate-fan-speed is restored.

4. The vehicle according to claim 1, further comprising:
   the at least one controller configured to recursively-adjust the speed-factor at each timed-interval by at least one of a constant-function and a non-linear nth-root-function that limits each climate-fan-speed adjustment by the speed-factor.

5. The vehicle according to claim 4, further comprising:
   the at least one controller configured to limit the adjustment according to one or more of an ambient temperature and a sunload, such that the adjustment in the speed-factor is increased when the ambient temperature exceeds a predetermined comfort-temperature.

6. The vehicle according to claim 4, further comprising:
   a cabin evaporator having an evaporator temperature sensor; and the at least one controller configured to correspondingly adjust the speed-factor in response to a temperature change in the evaporator temperature sensor.

7. A vehicle, comprising:
at least one controller configured to automatically stop an engine when a vehicle decelerates below an engine-stop-speed;
a climate control system (CCS) coupled to the at least one controller and configured with CCS-settings that include climate-fan-speed; and
the at least one controller configured to
step-down the climate-fan-speed, when operating above a predetermined mid-speed, by a predetermined initial-factor and at subsequent timed-intervals with a speed-factor that is decreased from the initial-factor at each timed-interval, such that an engine-restart signal is inhibited by cabin cooling reductions limited by the speed-factor,
set the predetermined initial-factor to limit the step-down to greater than or equal to approximately ninety percent, such that the stepped-down climate-fan-speed does not exceed approximately ten percent of an original-speed to inhibit the engine-restart signal,
receive and store the CCS-settings when the vehicle decelerates, and
step-down the climate-fan-speed when operative above about 50% of maximum-speed.

8. The vehicle according to claim 7, further comprising:
the controller further configured to reset the CCS with the stored CCS-settings in response to the engine-restart signal such that the climate-fan-speed is restored.

9. The vehicle according to claim 7, further comprising:
the at least one controller configured to recursively-adjust the speed-factor at each timed-interval by at least one of a constant-function and a non-linear nth-root-function that limits each climate-fan-speed adjustment by the speed-factor.

10. The vehicle according to claim 9, further comprising:
the at least one controller configured to limit the adjustment according to one or more of an ambient temperature and a sunload, such that the adjustment in the speed-factor is increased when the ambient temperature exceeds a predetermined comfort-temperature.

11. The vehicle according to claim 9, further comprising:
a cabin evaporator having an evaporator temperature sensor; and
the at least one controller configured to correspondingly adjust the speed-factor in response to a temperature change in the evaporator temperature sensor.

12. The vehicle of claim 1, wherein N is equal to 90.

* * * * *